Aug. 22, 1933.  J. W. LAYNE  1,923,381
RAKE
Filed Dec. 5, 1932
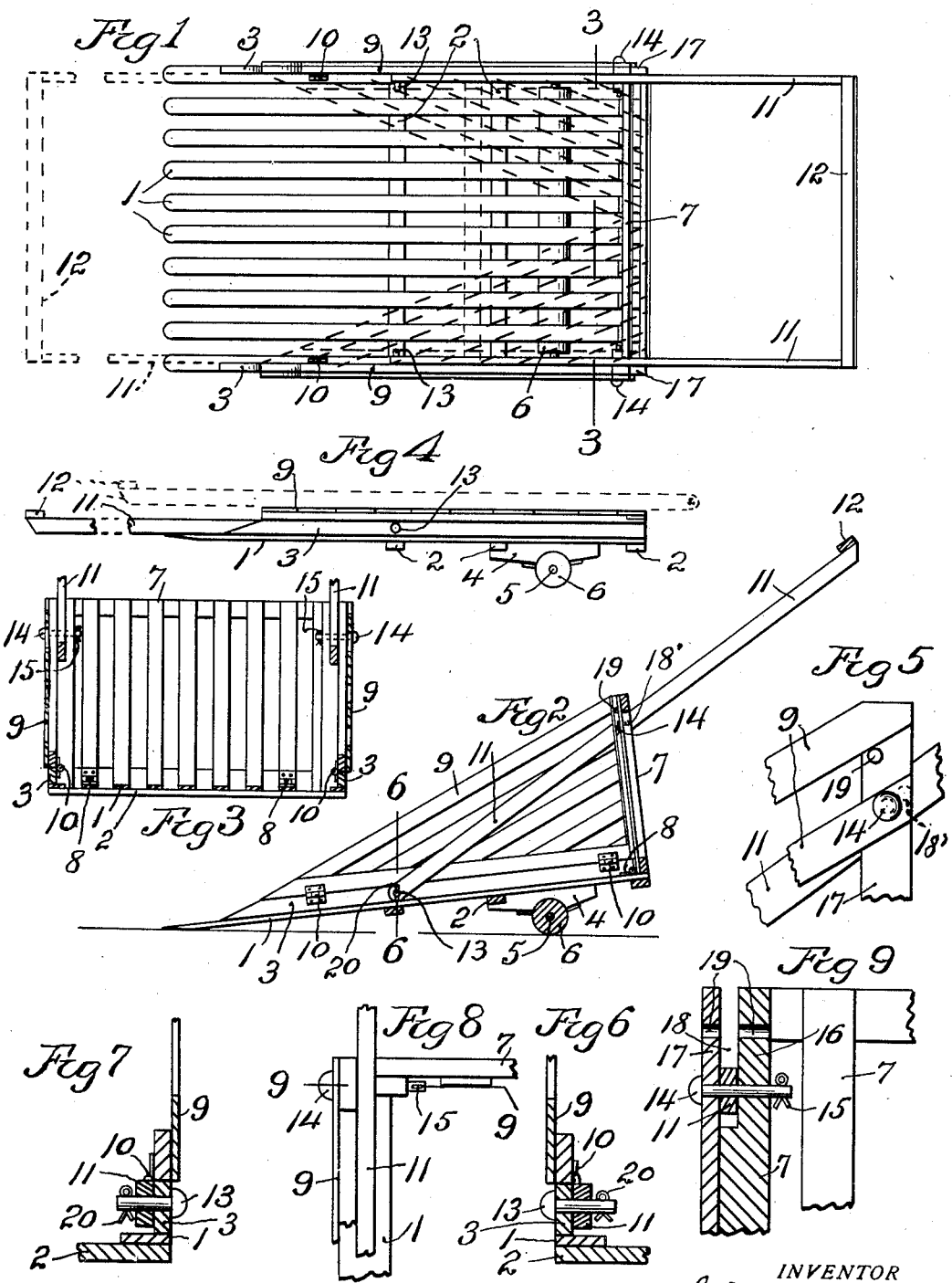
INVENTOR
BY Joseph W. Layne
Warren D. House
His ATTORNEY
Witness
H. Vernon Olson Patented Aug. 22, 1933

1,923,381

UNITED STATES PATENT OFFICE 1,923,381

RAKE

Joseph W. Layne, Higginsville, Mo., assignor to The Roloway Manufacturing Company, Higginsville, Mo., a Corporation of Missouri Application December 5, 1932. Serial No. 645,708

6 Claims. (Cl. 55—10)

My invention relates to improvements in rakes. It relates particularly to hand operated rakes adapted to collect leaves, cut grass or weeds or trash.

One of the objects of my invention is to provide a novel rake of the kind described, which is simple, cheap, strong, durable, not likely to get out of order, which can be easily and quickly collapsed into compact flat form for storage or transportation, and as readily assembled into upright operative condition.

The novel features of my invention are hereinafter fully described and claimed.

In the accompanying drawing, which illustrates the preferred embodiment of my invention, Fig. 1 is a plan view of my improved rake shown in solid lines in the upright operative position, and shown in dotted lines in the flat collapsed position.

Fig. 2 is a longitudinal sectional view of the rake with the parts shown in the operative position.

Fig. 3 is a section, partly broken away, on the line 3—3 of Fig. 1.

Fig. 4 is a side elevation of the rake shown collapsed.

Fig. 5 is an enlarged outside elevation of a part of the handle and a portion of one of the side wall members fastened thereto.

Fig. 6 is an enlarged section on the line 6—6 of Fig. 2.

Fig. 7 is an enlarged section of a left hand side portion of the rake, taken on the plane of the line 6—6 of Fig. 2.

Fig. 8 is an enlarged plan view of a portion of the handle, back member and one side member, shown fastened together in their operative positions.

Fig. 9 is a section on the line 9—9 of Fig. 8.

Similar characters of reference designate similar parts in the different views.

The rake is provided with a bottom frame comprising longitudinal teeth 1 fastened to the upper sides of cross bars 2, the outer teeth having respectively fastened to their upper sides longitudinal bars 3.

For furnishing a rolling support for the bottom frame, it is provided on its under side with two bearings 4 in which are rotatably mounted the ends of a transverse horizontal shaft 5 on which is mounted a roller 6.

A back wall member 7 is fastened at its lower edge by two hinges 8 to the upper sides of two of the teeth 1, Figs. 2 and 3.

Two longitudinal side wall members 9 have their lower edge portions respectively fastened by hinges 10 to the bars 3, Figs. 2 and 3.

A handle comprising two longitudinal bars 11 and a cross bar 12 attached to the rear ends of the bars 11, has its bars 11 fastened at their forward ends respectively to the bars 3, forward of the back member 7, by bolts 13. The bars 11 of the handle are adapted to be swung from the flat collapsed position, shown in solid lines in Fig. 4 and in dotted lines in Fig. 1, to an upwardly and rearwardly inclined position extending across the back member 7, as shown in Figs. 1, 2, 3, 8 and 9.

When the back member 7 and side members 9 are in the upright position, they are releasably locked in said position by two bolts 14, provided respectively with cotter pins 15, the said bolts being respectively extended through horizontal holes provided in the side edge bars 16 of the back member 7, and through horizontal holes provided respectively through the rear upright bars 17 of the side wall members 9. Between each pair of bars 16 and 17 at the upper portions thereof is provided a space 18 through which extends the adjacent bar 11 of the handle.

The bolts 14 respectively extend through holes provided therefor in the bars 11 of the handle, Figs. 3 and 9.

In order that the handle may be given a steeper inclination than which is shown in Fig. 2, the bars 11 are each provided with another hole 18 adapted to receive the adjacent bolt 14, and to aline with two alined holes 19 in the bars 16 and 17, Figs. 2, 5 and 9.

When the parts are in the operative positions, shown in Figs. 1, 2 and 3, the rake is pushed about by the handle with the front ends of the teeth 1 resting against the ground. After a load has been collected, the bottom frame may be swung upwardly at its front end and downwardly at its rear end to a position in which the load will balance over the roller 6 upon which the rake with its load may then be trundled to the place where the load is to be dumped, at which time the rake may be dumped of its load by raising upwardly on the handle, using the front ends of the teeth 1 as a fulcrum.

To collapse the rake for transportation to distances, or for storage, the cotter pins 15 are withdrawn from the handle bars 11, and bars 16 and 17. The handle is then swung on the bolts 13 to the collapsed position shown in solid lines in Fig. 4 and in dotted lines in Fig. 1, after which the back wall member 7 is swung forwardly onto the teeth 1, and the side wall members 9 are then swung on the hinges 10 upon the back wall member 7, as shown in dotted lines in Fig. 1.

If it is desired to contract the length of the collapsed rake, the bolts 13, which are respectively provided with cotter pins 20, may be withdrawn, and the handle then disposed on the side members 9, as shown in dotted lines in Fig. 4.

I do not limit my invention to the structure shown and described, as many modifications, within the scope of the appended claims, may be made without departing from the spirit of my invention.

What I claim is:—

1. In a rake, a bottom frame having longitudinal collecting teeth, a transverse back wall member and two longitudinal spaced apart side wall members hinged to said frame and adapted to be swung from a flat collapsed position to an upright position, and means for releasably fastening said back and side members in the upright position.

2. In a rake, a bottom frame having longitudinal collecting teeth, a transverse back wall member and two longitudinal spaced apart side wall members hinged to said frame so as to swing from a flat collapsed position to an upright position, means for releasably fastening said members in the upright position, and a handle hinged to said frame so as to be swung from a flat collapsed position to an upwardly and rearwardly inclined position.

3. In a rake, a bottom frame having longitudinal collecting teeth, a transverse back wall member and two longitudinal spaced apart side wall members hinged to said frame so as to swing from a collapsed flat position to an upright position, a handle hinged to said frame so as to be swung from a flat collapsed position to a position inclining upwardly and rearwardly over said back member, and means for releasably fastening said back and side members in the upright position and said handle in said inclined position.

4. In a rake, a bottom frame having longitudinal collecting teeth, a transverse back wall member and two longitudinal spaced apart side wall members hinged to said frame so as to swing from an upright position to a flat collapsed position across said frame, a handle hinged to said frame forward of said back member so as to swing from a flat collapsed position across said frame to a position in which it will incline upwardly and rearwardly across said back member, when the latter is upright, and means releasably fastening said handle to said back and side members with the handle in the inclined position and the back and side members in the upright position.

5. In a rake, a bottom frame having longitudinal collecting teeth, a back wall member hinged to said frame so as to swing from a flat collapsed position to an upright position, and a handle hinged to said frame forward of said back member so as to swing from a flat collapsed position to an upwardly and rearwardly inclined position extending across said back member, and means for releasably locking said handle to said back member when the latter is upright and the handle is in said inclined position.

6. In a rake, a bottom frame having longitudinal collecting teeth, a back wall hinged to said frame so as to swing forwardly from an upright position to a flat collapsed position across said frame, two longitudinal side wall members spaced apart and hinged to said frame so as to swing from an upright position to a flat collapsed position across said frame, a handle hinged to said frame forward of said back member so as to be swung from a forwardly extending flat collapsed position across said frame upwardly and rearwardly across said back member, and means for releasably fastening said back member to said side members and to said handle when the latter is in the inclined position and said side and back members are in the upright position.

JOSEPH W. LAYNE.